(12) United States Patent
Groleau

(10) Patent No.: US 11,420,554 B2
(45) Date of Patent: Aug. 23, 2022

(54) VEHICLE HORN CONTROL DEVICE

(71) Applicant: Autoliv Development AB, Vargarda (SE)

(72) Inventor: Laurent Groleau, Quincay (FR)

(73) Assignee: Autoliv ASP, Inc., Ogden, UT (US)

( * ) Notice: Subject to any disclaimer, the term of this patent is extended or adjusted under 35 U.S.C. 154(b) by 310 days.

(21) Appl. No.: 16/494,071

(22) PCT Filed: Mar. 12, 2018

(86) PCT No.: PCT/EP2018/056085
§ 371 (c)(1),
(2) Date: Sep. 13, 2019

(87) PCT Pub. No.: WO2018/166974
PCT Pub. Date: Sep. 20, 2018

(65) Prior Publication Data
US 2021/0347299 A1    Nov. 11, 2021

(30) Foreign Application Priority Data
Mar. 14, 2017  (FR) ...................................... 1752051

(51) Int. Cl.
| | |
|---|---|
| *B60Q 5/00* | (2006.01) |
| *B60R 16/00* | (2006.01) |
| *B60R 16/027* | (2006.01) |
| *H01H 13/14* | (2006.01) |
| *H01H 13/52* | (2006.01) |

(52) U.S. Cl.
CPC ............. *B60Q 5/003* (2013.01); *H01H 13/14* (2013.01); *H01H 13/52* (2013.01); *B60R 16/005* (2013.01); *B60R 16/027* (2013.01)

(58) Field of Classification Search
CPC ..... B60Q 5/003; B60R 16/027; B60R 16/005; H01H 13/14; H01H 13/52
See application file for complete search history.

(56) References Cited

U.S. PATENT DOCUMENTS

| 7,173,202 B2* | 2/2007 | Tsujimoto | ............... | B60Q 5/003 |
| | | | | 200/61.54 |
| 7,322,602 B2* | 1/2008 | Tsujimoto | ............... | B60Q 5/003 |
| | | | | 200/61.54 |

* cited by examiner

*Primary Examiner* — Vanessa Girardi
(74) *Attorney, Agent, or Firm* — Matthew D. Thayne; Thayne and Davis LLC

(57) ABSTRACT

Vehicle horn control device, embedded on a vehicle steering wheel, comprising: a base part (10); a control part (20), movable between a rest position and a depressed position; elastic return means (31), for pushing back the control part (20) to the rest position,—positioning means (41); an electrical circuit with at least one switch comprising a second contact terminal (51; 151; 251*a*, 251*b;* 21, 452), embedded on the control part (20), and a first contact terminal (52; 152; 252; 441), secured to the base part (10), characterized in that the positioning means (41) comprises the initial contact terminal (52; 152; 252; 441) arranged to position the control part (20) in the rest position, so as to close the switch when the control part (20) is in the rest position.

15 Claims, 5 Drawing Sheets

[FIG. 1]
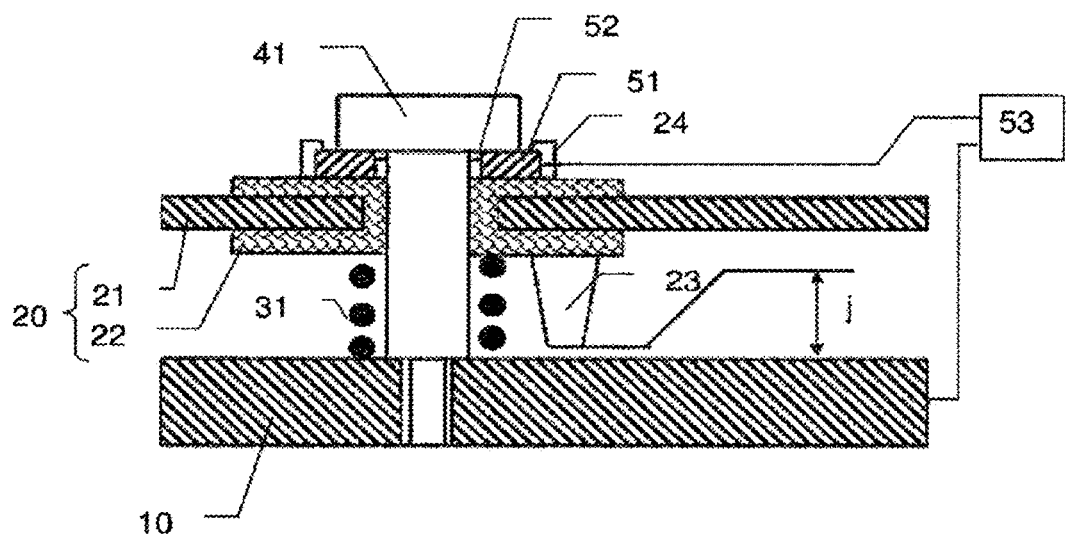
[FIG. 2]
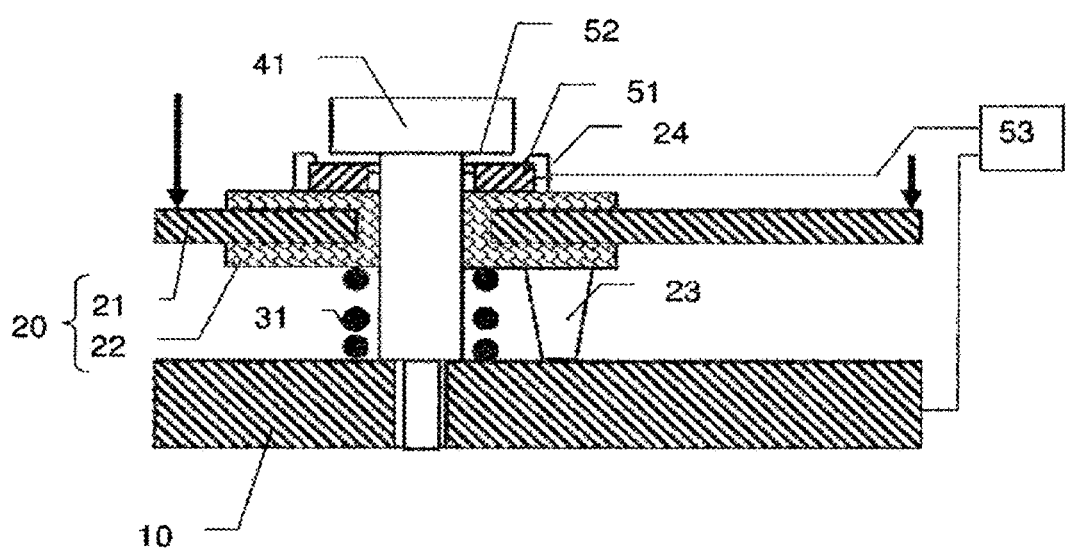

[FIG. 3]
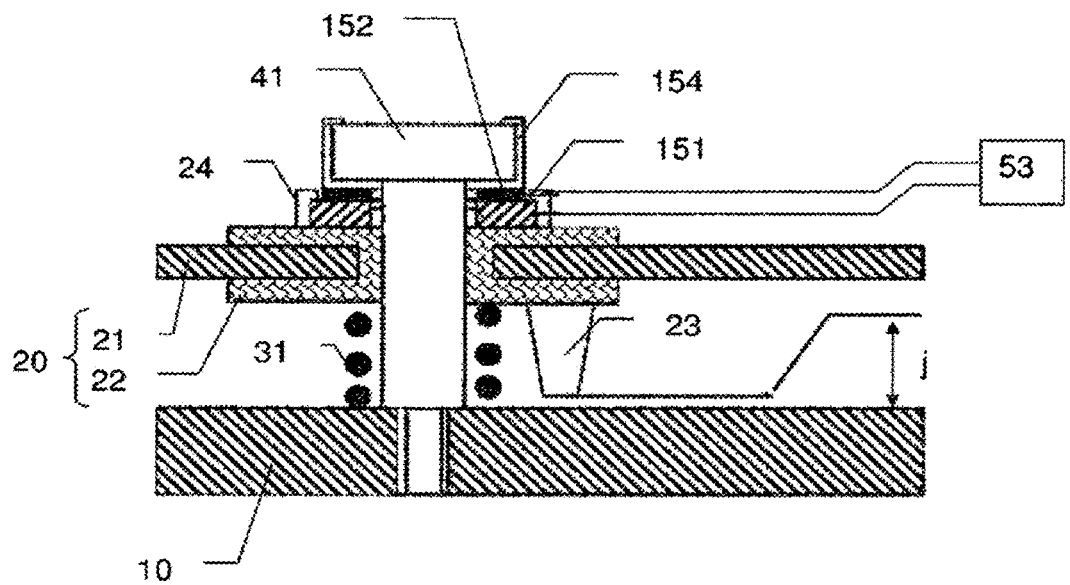
[FIG. 4]
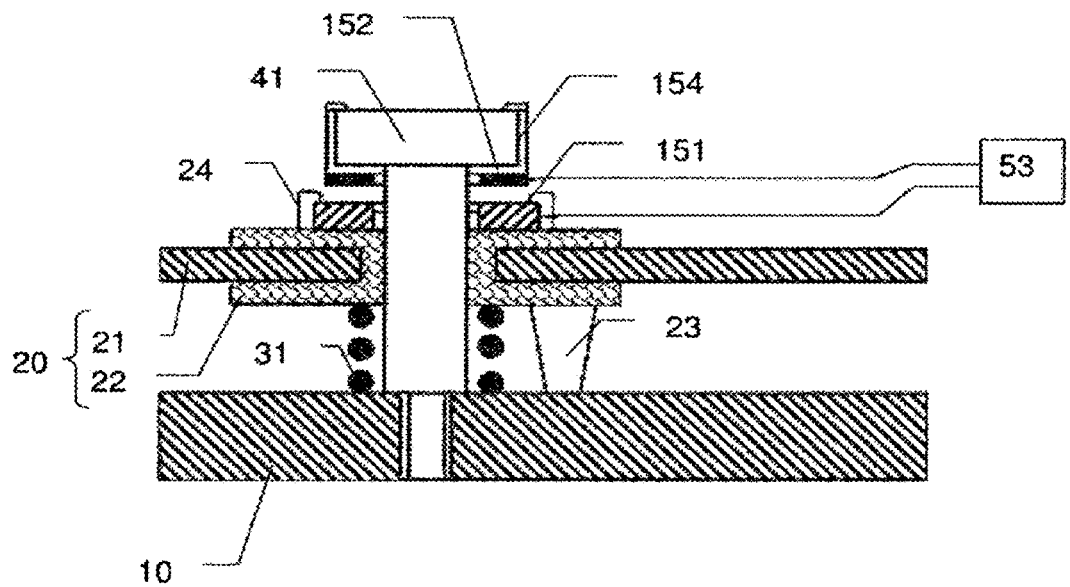

[FIG. 5]
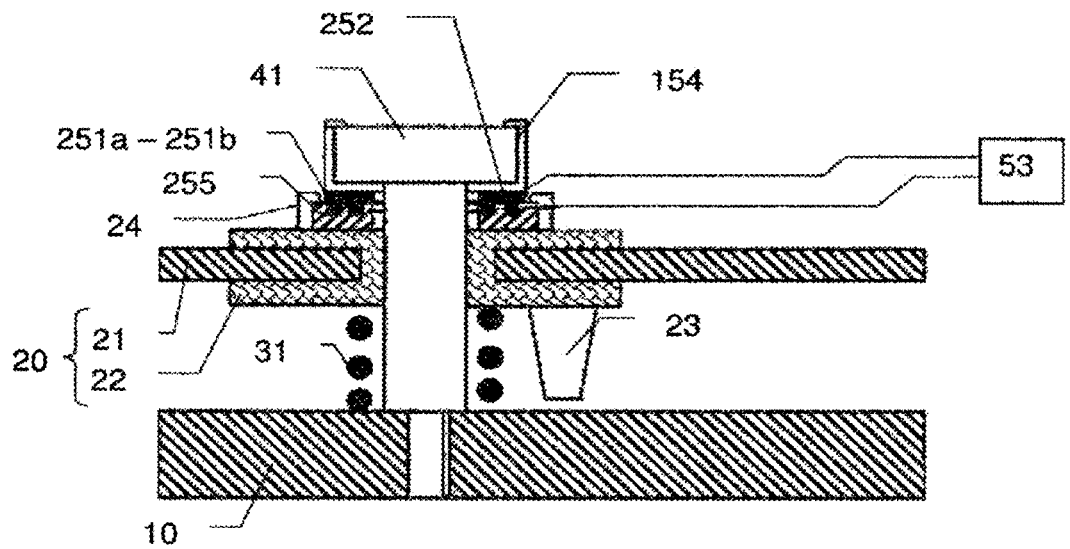
[FIG. 6]
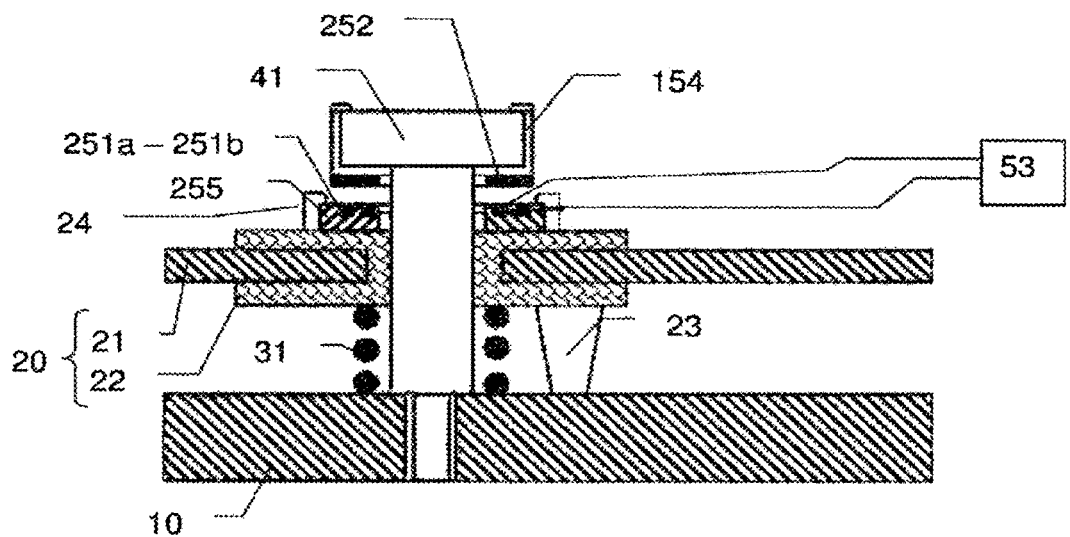
[FIG. 7]
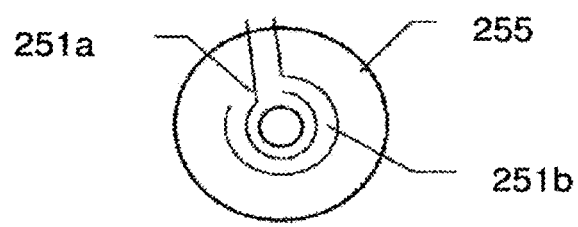

[FIG. 8]
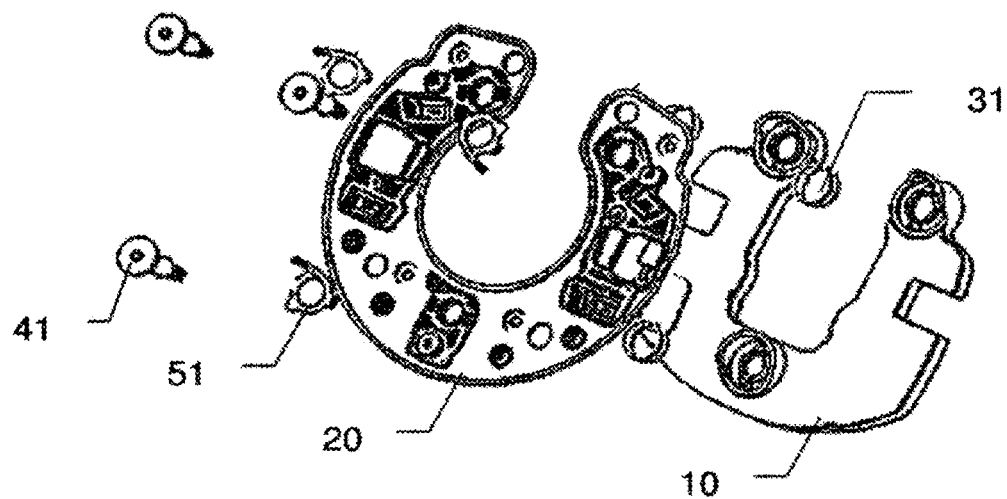
[FIG. 9]

[FIG. 10]
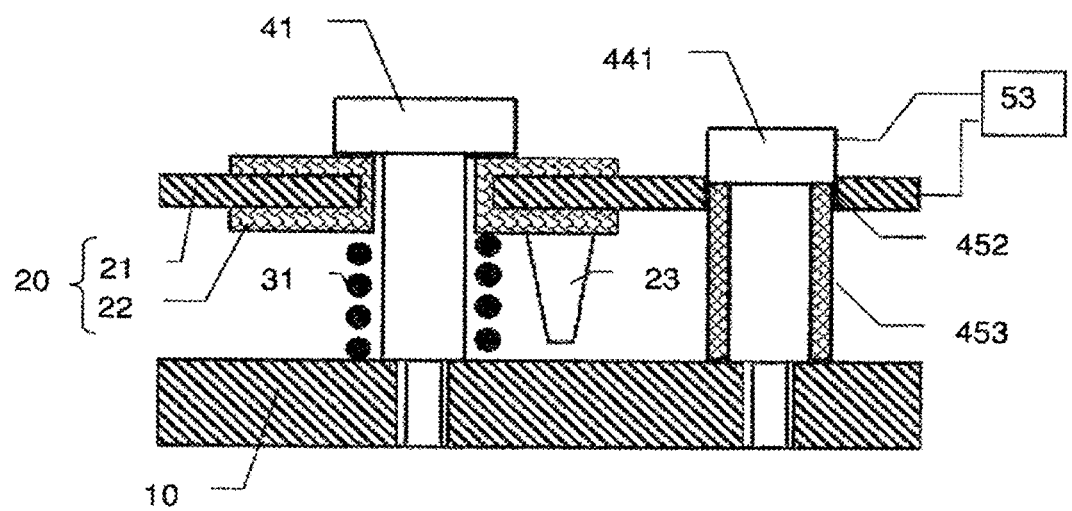
[FIG. 11]
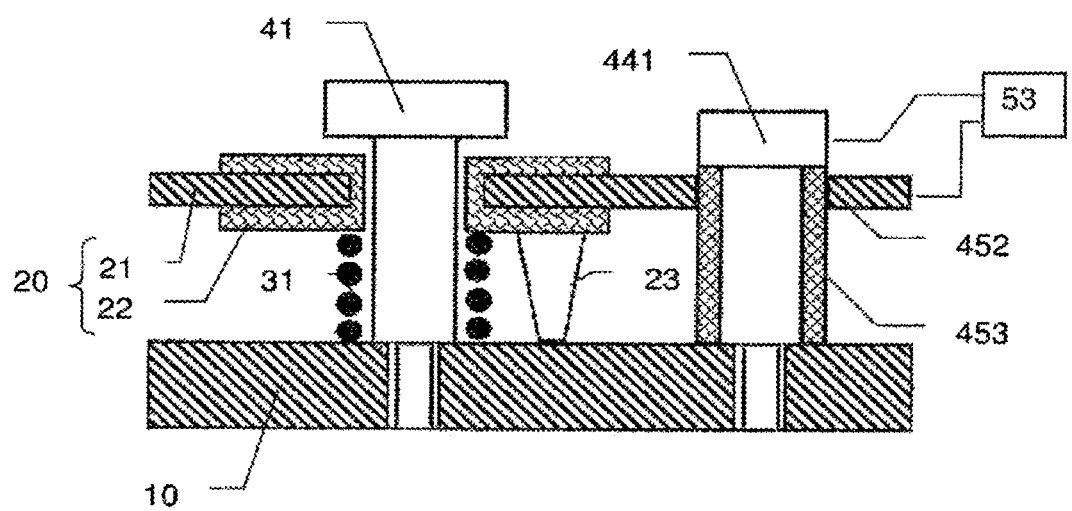

VEHICLE HORN CONTROL DEVICE

The present invention generally relates to a motor vehicle horn control device.

It is discussed in the prior art on horn control devices, otherwise known as horns. For example, document U.S. Pat. No. 6,119,545 describes a control device integrated into a steering wheel safety module, with a switch which changes status when the user presses a control part. This system however presents, notably, the disadvantage of requiring a long control stroke, as well as numerous components for guiding, stopping, i.e. positioning the movable parts of the control device. It also requires elastic return means to return the movable parts to the rest position, and due to the long stroke and the vibrations, it is difficult to accommodate adequate firmness to limit the vibrations while obtaining smooth control.

One aim of the present invention is to resolve the disadvantages of the aforementioned documents on the prior art mentioned above, and in particular, first of all, to propose a horn control device which presents a simple architecture, while displaying rapid control sensing.

To do so, an initial aspect of the invention relates to a vehicle horn control device, embedded, or arranged to be embedded on a vehicle steering wheel, comprising:
a base part,
a control part, movable with respect to the base part between a rest position and a depressed position,
elastic return means, arranged to push back the control part from the depressed position to the rest position,
positioning means, arranged to impose the rest position on the control part,
an electrical circuit with at least one switch comprising a second contact terminal, embedded on the control part, and a first contact terminal, secured to the base part,
characterized in that the positioning means comprise the first contact terminal which is arranged to position the control part in the rest position, so as to close the switch when the control part is in the rest position.

According to the above implementation the control device presents a simple architecture, since the switch is partially integrated into the positioning means. Such an accumulation of functions on the same parts reduces the number of components required. Moreover, the switch is closed when the control part is in the rest position. This means the device detects the opening of the switch, which is turned on as soon as the control part starts moving, therefore enabling rapid control sensing. This also helps limit the command stroke and the clearances visible between the fixed and movable parts.

As the base part is arranged to be attached to the steering wheel, we can consider that this part is a reference part or even a "static" part, so that the first contact terminal can be called a reference contact terminal or static contact terminal since it is secured to the base part. In addition, since the second contact terminal is secured to the control part which is movable in relation to the base part, this second contact terminal can be termed a movable contact terminal.

Advantageously, the positioning means are stopping means comprising the first contact terminal which is arranged to form a mechanical stop for the control part when returned to the rest position by the return means. Such stopping means ensure the repeatable positioning of the control part in the rest position.

In other words, according to an implementation, the invention relates to a vehicle horn control device, embedded, or arranged to be embedded on a vehicle steering wheel, comprising:
a base part,
a control part, movable with respect to the base part between a rest position and a depressed position,
elastic return means, arranged to push back the control part from the depressed position to the rest position,
stopping means, arranged to impose the rest position on the control part,
an electrical circuit with at least one switch comprising a second contact terminal, embedded on the control part, and a first contact terminal, secured to the base part,
characterized in that the stopping means comprise the first contact terminal arranged to enter into mechanical abutment with the control part in the rest position, so as to close the switch when the control part is in the rest position.

Advantageously, the stopping means comprise guiding means of the control part.

Advantageously, the second contact terminal enters into mechanical abutment with the first contact terminal when the control part is in the rest position.

Advantageously, the positioning means are guiding means wherein:
one from the first contact terminal or the second contact terminal forms or is part of a sliding bar and
the other from the first contact terminal or second contact terminal forms or is part of a slide,
so as to guide the control part recalled to rest position by the return means.

Advantageously:
the sliding bar comprises a portion which conducts electricity, and a portion that is electrically insulating,
the slide is formed by a female part arranged at least partially around the sliding bar.

Advantageously, the aforementioned portion which conducts electricity is a portion at the extreme of the rod, which is in contact with the slide when the control part is in the rest position.

Advantageously, the stopping means comprise a rod forming the first contact terminal, or the second contact terminal, which conducts electricity and which is part of the electrical circuit. The rod itself is part of the electrical circuit, as is the contact surface of the first contact terminal.

Advantageously, the rod is shouldered, and/or is a shoulder screw, and the shoulder of the rod forms a mechanical stop.

Advantageously, the base part is in material that conducts electricity and is part of the electrical circuit. Integration of the base part into the electrical circuit helps to simplify the cabling.

Advantageously, the rod is attached to the base part.

Advantageously, the base part is insulated or arranged to be electrically insulated from the mass of the vehicle Advantageously, the stopping means comprise a shoulder rod, which conducts electricity, wherein the initial contact terminal is attached to the shoulder rod, the device comprising electrical insulation means arranged between the rod and the first contact terminal.

Advantageously, the insulation means consist of an insulating washer, and wherein the initial contact terminal is a metal washer attached to the insulating washer.

Advantageously, the insulation means consist of an insulating washer, wherein one of the first contact terminal or the second contact terminal comprises two electrical tracks formed on the insulating washer, and wherein the other of the first contact terminal or the second contact terminal is a conducting part of the control part, arranged to come into contact with the two electrical tracks when the control part is in the rest position.

Advantageously, the positioning means comprise an insulation part, electrically insulating, wherein one of the first contact terminal or the second contact terminal is a metal portion formed on the insulation part, and wherein the other of the first contact terminal or second contact terminal is a conducting part, arranged to come into contact with the metal portion when the control part is in the rest position.

Advantageously, the insulation means consist of an insulating washer, and the first contact terminal is a metal washer attached to the insulating washer.

Advantageously, the positioning means comprise an insulation part, electrically insulating, one of the first contact terminal or the second contact terminal comprises two electrical tracks formed on the insulation part, and the other of the first contact terminal or second contact terminal is a conducting part, arranged to come into contact with the two electrical tracks when the control part is in the rest position.

Advantageously, the electrical circuit comprises at least one electronics unit arranged to detect an opening of the switch when the control part leaves the rest position.

Advantageously, the control device comprises a plurality of switches each having a first contact terminal and a second contact terminal, wherein the positioning means comprise a plurality of positioning units, wherein each positioning unit comprises one of the first contact terminals.

Advantageously, the control device comprises a plurality of electrical circuits, each comprising one of the aforesaid switches and an electronics unit arranged to detect an opening of the switch.

Advantageously, the control part is a molded-on part which conducts electricity. Thus, the control part may be part of the electrical circuit and the over-molding can be used to ensure a good interface between the control part and the positioning means.

Advantageously, a stroke of the control part between the rest position and the depressed position is lower than 1 mm.

Advantageously, the elastic means are arranged to exert a return force greater than 20N.

Advantageously, the base part is a frame of the steering wheel.

Advantageously, the control part is a support part arranged to accommodate a safety module. Thus, the positioning elements may also contribute to the retention of the safety module during its triggering which enables the number of components to be reduced and makes the device more compact.

Advantageously, the control part is a safety module lid or hood.

Advantageously, the device comprises dampening means arranged between the control part and a guide part, to absorb vibrations, and/or obtain clearance for assembly. Typically, the dampening means are a silent block inserted between an over-molding (of the control part, for example) and a guide bushing.

A second aspect of the invention relates to a vehicle steering wheel comprising a control device in accordance with the first aspect of the invention.

Advantageously, the steering wheel comprises a safety module, mounted on the control part. The assembly must be robust and must stand up to the weight of the safety module, with positioning means which correctly guide such an assembly (of a weight greater than several hundred grams). Moreover, during use, the control part and the positioning means must also stand up to the severe constraints imposed by the rapid release of the air bag. In particular, the control part is a metal plate with a thickness comprised between 0.5 mm and 2 mm.

A third aspect of the invention relates to a motor vehicle comprising a vehicle steering wheel in accordance with the second aspect of the invention.

Other features and benefits of the present invention will be seen more clearly from reading of the following detailed description of several implementations of the invention, provided by way of a non-limiting example and illustrated by the appended drawings, wherein:

FIG. 1 represents an initial embodiment of a horn control device, in a rest position;

FIG. 2 represents the control device from FIG. 1 in a depressed position;

FIG. 3 represents a second embodiment of a horn control device, in a rest position;

FIG. 4 represents the control device from FIG. 3 in a depressed position;

FIG. 5 represents a third embodiment of a horn control device, in a rest position;

FIG. 6 represents the control device from FIG. 5 in a depressed position;

FIG. 7 represents a detail of the control device from FIG. 5;

FIG. 8 represents a detail of the control device from FIG. 1;

FIG. 9 represents a detailed view of a component of the control device of FIG. 1;

FIG. 10 represents a fourth embodiment of a horn control device, in a rest position;

FIG. 11 represents the control device from FIG. 8 in a depressed position;

FIG. 1 represents a horn control device mounted on a steering wheel, according to a first embodiment of the invention, and which comprises:

a frame 10 of the steering wheel, forming a base part, a shoulder screw 41, attached to the frame 10, a panel 20 comprising a plate 21 with an over-molding 22, guided by a cylindrical part of the shoulder screw, a washer 51, embedded on panel 20 as it is held by hooks 24 of the over-molding 22, a spring 31 forming return means and using the frame 10 as a support to push back the washer 51 from the panel 20 against the shouldering of the shoulder screw 41.

The panel 20 is therefore pushed upwards from 5 FIG. 1 by the spring 31, it is therefore in the rest position, and the panel 20 may slide along the shoulder screw 41 to reach a depressed position, as shown in FIG. 2. The panel 20 thus forms a control part which can be pushed from the rest position in FIG. 1 to the depressed position in FIG. 2 by a user when s/he wants to beep the horn. A contact 23 forms a stopper at the end of the stroke supporting itself on the frame 10.

In other words, the shoulder screw 41 with the washer 51 form positioning means and in particular stopping means, for positioning the panel 20 in the rest position, since it is pushed back there by spring 31.

Typically, the panel 20 has an embedded safety module (an air bag) and the user presses on the latter to activate the horn. The safety module is therefore embedded on the panel 20 and is movable with respect to the frame of the steering wheel. However, the control part may be only a lid or a hood of the safety module in another embodiment.

To detect the movement of the panel, the invention proposes to form an electrical switch with the washer 51 which forms a second contact terminal, and a surface 52 of the shoulder of the shoulder screw 41, which then forms a first contact terminal.

An electrical circuit is then formed by:
the frame 10,
the shoulder screw 41,
the initial contact terminal (surface 52),
the second contact terminal (washer 51),
an electronics unit 53 linked on one hand to the frame 10 and on the other to the washer 51, and which is arranged to detect the opening of the electrical circuit, i.e. the moment when the washer 51 is no longer in physical and/or electrical contact with the surface 52.

In other words, the first contact terminal (surface 52) is part of a sliding bar (shoulder screw 41), and the second contact terminal (washer 51) is part of a slide (over-molding 22). However, an inverse construction may be envisaged, i.e. that the first contact terminal can be part of a slide, which could encircle and slide with respect to the second contact terminal which would then be part of a sliding bar.

As a consequence, the control detection takes place the moment the panel 20 is moved, which procures very rapid detection, and this helps keep the stroke (depicted by clearance "j" on FIG. 1) of the panel 20 at very low values, i.e. lower than 1 mm. It is therefore possible to increase the stiffness of the spring 31 to limit the vibrations, as the stroke is small (therefore the elastic effort slightly increases alongside this small stroke), and it is not even necessary to reach the stopper at the end of the stroke to set off the horn.

In particular, it is possible to design a stroke less than or equal to 1 mm and preferentially to 0.5 mm, and, even, less than or equal to 0.3 mm. As a consequence, at the level of the movable trim parts there can be a smaller clearance with the static trim parts of the steering wheel than those seen in the prior art. For the prior art, there's a clearance of around 4 mm, and the invention therefore allows this clearance to be reduced to values lower than 2 mm, which improves the quality perceived by the client.

Alternatively, a clearance "j" can be provided between the movable and static trim parts.

Several shoulder screws 41 (typically three) can of course be implemented to guide the panel 20, to form several positioning units or terminal units, with the option of forming a switch at the level of each terminal unit. All these switches can be implemented in series, or in parallel from the same electrical circuit with a single electronics unit 53, or an electrical circuit for each switch of each terminal unit can be implemented with an electronics unit 53 to provide several horn activation options: as soon as at least one switch is on, at least two switches are on, or all of the switches are on.

In this embodiment we can see that the positioning means comprise the rod of the shoulder screw 41 which seen from above, blocks two translations in X and Y, and the surface 52, which blocks a degree of freedom in Z (axis shoulder screw 41). They also comprise the over-molding 22 which blocks a degree of freedom of rotation. With respect to FIG. 1 or 2, it must be understood that the positioning means comprise moreover, for example, an index or another sliding bar/slide subset for blocking seen from above a rotation around the axis of the shoulder screw 41, or axis Z.

FIGS. 3 and 4 depict a second embodiment of the invention. This second embodiment only differs from the first embodiment in terms of the electrical circuit. The features already described will not be described again.

In the present case, the electrical circuit is formed by:
a washer 151 embedded on the panel 20, and forming a second contact terminal,
a washer 152 secured to the shoulder screw 41, and forming a first contact terminal,
the electronics unit 53 linked on one hand to the washer 151 and on the other hand to washer 152.

In the present case, insulation means in the form of a protection 154 are inserted between the head of the shoulder screw 41 and the washer 152. As a consequence, the electrical circuit does not include the shoulder screw 41, nor the frame 10. Likewise, for the first embodiment above, the first contact terminal and the second contact terminal form stopping means and enter into mechanical abutment to close the electrical circuit as soon as the panel 20 returns to the rest position (FIG. 3). The contact is lost as soon as the panel is moved to go into the depressed position (FIG. 4).

FIGS. 5 to 7 depict a third embodiment of the invention. This third embodiment only differs from the second embodiment in terms of the electrical circuit. The features already described will not be described again.

In the present case, the electrical circuit is formed by:
two tracks 251*a* and 251*b* formed on an insulating washer 255 embedded on the panel 20, and forming a second contact terminal,
a washer 252 secured to the shoulder screw 41, and forming a first contact terminal,
the electronics unit 53 linked on the one hand to the track 251*a* and on the other hand to the track 251*b*.

In the present case, insulation means in the form of a protection 154 are inserted between the head of the shoulder screw 41 and the washer 252 on one hand, and between the two contact tracks 251*a* and 251*b* on the other hand (this is the insulating washer 255). As a consequence, the electrical circuit does not include the shoulder screw 41, nor the frame 10. As in the first and second embodiment above, the first contact terminal and the second contact terminal form stopping means and enter into mechanical abutment to close the electrical circuit as soon as panel 20 returns to the rest position (FIG. 5). The contact is lost as soon as the panel 20 is moved to go into the depressed position (FIG. 6). In particular, the washer 252 contacts simultaneously the tracks 251*a* and 251*b*, so as to conduct the current from one to the other. This implementation simplifies the connection cabling with the electronics unit since the cabling is only supported by a single part, the panel 20.

Typically, the horn is supplied with strong current (greater than 4 amps), whereas the electrical circuit of the control device is supplied with weak current (less than 1 amp) to limit any risk of electric arc between the first contact terminal and the second contact terminal.

FIG. 7 depicts a view from above of the insulating washer 255, with the two tracks 251*a* and 251*b*, which can be printed, engraved or bonded to the insulating washer 255.

FIG. 8 represents an exploded view of the control device in FIG. 1, which comprises in total three positioning units (herein stopping units), each comprising a shoulder screw 41, a washer 51 and a spring 31, so as to guide and put and position the panel 20 into abutment with the frame 10.

FIG. 9 represents a view of the washer 51, which comprises an electrical connection interface, and two clips to be attached to the panel 20. Thus we can see that the device from FIG. 8 comprises three guide units with each one a first contact terminal (shoulder screw 41), and a second contact terminal (washer 51), so as to form three different switches.

FIGS. 10 and 11 depict a fourth embodiment of the invention. In the case depicted, the shoulder screw 41 only forms stopping means. A clearance can be observed between the shoulder screw 41 and the over-molding 22 of the panel 20. In this embodiment, a shoulder positioning screw 441 comprises an insulating tube 453 around its cylindrical part, and thus forms a cylindrical positioning contact which cooperates with a cylinder bore 452 of the panel 20 to form positioning means which are guiding means. In effect, in this embodiment, the screw 441, the insulating tube 453 and the cylinder bore 452 of the plate 21 cooperate to block two degrees of freedom of the panel 20 (two translations X-Y, seen from above), and the shoulder screw 41 blocks for its part a degree of freedom (the translation following its axis), so that we see the clearance between the over-molding 22 and the rod of the shoulder screw 41.

In the present case, the electrical circuit is formed by:
the plate 21 which forms with the cylinder bore 452 a second contact terminal,
the extreme part of the positioning contact (the head of the positioning shoulder screw 441) at the level of its cylindrical lateral surface which forms a first contact terminal,
the electronics unit 53 linked on one hand to the plate 21 and on the other hand to the positioning shoulder screw 441.
In other words, the positioning means include the first contact terminal (the head of the screw 441) and the second contact terminal (the cylinder bore 452 of the plate 21). The positioning means also include the insulating tube 453.

When the panel 20 is in the rest position (FIG. 10), the first contact terminal and the second contact terminal are in electrical contact to close the electrical circuit. The contact is lost as soon as the panel 20 is moved to go into the depressed position (FIG. 11). As a consequence, the electronics unit 53 detects an opening of the electrical circuit and can control the functioning of the horn.

It will be understood that various modifications and/or improvements obvious to those skilled in the art can be made to the different embodiments of the invention described in the present description, without going beyond the scope of the invention as defined by the appended claims.

The invention claimed is:

1. Vehicle horn control device, arranged to be embedded on a vehicle steering wheel, comprising:
   a base part,
   a control part, movable with respect to the base part between a rest position and a depressed position,
   at least one elastic return feature, arranged to push back the control part from the depressed position to the rest position,
   at least one positioning feature, arranged to impose the rest position to the control part,
   an electrical circuit with at least one switch comprising a second contact terminal, embedded on the control part, and a first contact terminal, secured to the base part,
   characterized in that the positioning feature comprises the first contact terminal which is arranged to position the control part in the rest position, so as to close the switch when the control part is in the rest position.

2. Vehicle horn control device according to claim 1, wherein the positioning feature is a stopping feature comprising the first contact terminal which is arranged to form a mechanical stop at the control part returned to the rest position by the elastic return feature.

3. Vehicle horn control device according to claim 1, wherein the positioning feature comprises an insulation part, which is electrically insulating, wherein one from the first contact terminal or second contact terminal is a metal portion formed on the insulation part, and wherein the other from the first contact terminal or second contact terminal is a conducting part, arranged to be in contact with the metal portion when the control part is in the rest position.

4. Vehicle horn control device according to claim 1, wherein the positioning feature comprises an insulation part, which is electrically insulating, wherein one of the first contact terminal or the second contact terminal comprises two electrical tracks formed on the insulation part, and wherein the other from the first contact terminal or from the second contact terminal is a conducting part, arranged to be in contact with the two electrical tracks when the control part is in the rest position.

5. Vehicle horn control device according to claim 1, comprising a plurality of switches each having a first contact terminal and a second contact terminal,
   wherein the positioning feature comprises a plurality of positioning units,
   wherein each positioning unit comprises one of the first contact terminals.

6. Vehicle horn control device according to claim 1, wherein a stroke of the control part between the rest position and the depressed position is lower than 1 mm.

7. Vehicle horn control device according to claim 1, wherein the elastic return feature is arranged to exert a return force greater than 20N.

8. Vehicle steering wheel comprising a vehicle horn control device according to claim 1.

9. Vehicle horn control device according to claim 1 in combination with a motor vehicle.

10. Vehicle horn control device according to claim 1, wherein the positioning feature is a guide feature wherein:
    one from the first contact terminal or from the second contact terminal is part of a sliding bar and
    the other from the first contact terminal or second contact terminal is part of a slide,
    so as to guide the control part recalled to the rest position by the elastic return feature.

11. Vehicle horn control device according to claim 10, wherein
    the sliding bar comprises a terminal portion which conducts electricity, and an electrically insulating portion,
    the slide is formed by a female part arranged at least partially around the sliding bar.

12. Vehicle horn control device according to claim 1, wherein the positioning feature comprises a rod forming the first contact terminal, which conducts electricity and which is part of the electrical circuit.

13. Vehicle horn control device according to claim 12, wherein the rod is shouldered.

14. Vehicle horn control device according to claim 1, wherein the base part is in electrically conducting material and is part of the electrical circuit.

15. Vehicle horn control device according to claim 14, wherein the base part is arranged to be electrically insulated from the mass of the vehicle.

* * * * *